United States Patent

Eisele

[11] Patent Number: 5,913,967
[45] Date of Patent: Jun. 22, 1999

[54] APPARATUS FOR SMOKING FOOD

[76] Inventor: Josef Eisele, Mechanikermeister, Talstrasse, D-73113 Ottenbach, Germany

[21] Appl. No.: 08/987,492

[22] Filed: Dec. 9, 1997

Related U.S. Application Data

[62] Division of application No. 08/758,975, Dec. 2, 1996, Pat. No. 5,762,985, which is a continuation of application No. 08/420,961, filed as application No. PCT/EP93/02840, Oct. 14, 1993, abandoned.

[30] Foreign Application Priority Data

Oct. 14, 1992 [DE] Germany ............................ 42 34 656

[51] Int. Cl.$^6$ ................................ A23L 1/00; A47J 36/38
[52] U.S. Cl. ................................ 99/468; 99/476; 99/481; 99/482
[58] Field of Search ................................ 99/467, 468, 481, 99/482, 516, 534, 476, 477; 126/25 R, 9 R, 59.5, 21 A; 426/314, 315; 452/51; 219/400, 388

[56] References Cited

U.S. PATENT DOCUMENTS

| | | |
|---|---|---|
| 3,643,587 | 2/1972 | Harrington et al. ....................... 99/477 |
| 3,861,292 | 1/1975 | Gilliland et al. .......................... 99/476 |
| 3,871,353 | 3/1975 | Haug ....................................... 126/59.5 |
| 3,877,361 | 4/1975 | Trainor et al. ............................ 99/478 |
| 3,933,145 | 1/1976 | Reich ..................................... 126/25 R |
| 3,969,996 | 7/1976 | Huang et al. .............................. 99/476 |
| 4,455,924 | 6/1984 | Wenzel .................................. 99/482 X |
| 4,532,858 | 8/1985 | Hershfeld ................................ 99/534 |
| 4,558,196 | 12/1985 | Babasade .............................. 99/481 X |
| 4,583,454 | 4/1986 | Huang et al. .......................... 99/482 X |

*Primary Examiner*—Timothy F. Simone
*Attorney, Agent, or Firm*—Brooks & Kushman P.C.

[57] ABSTRACT

Apparatus for smoking food includes a closed smoking chamber for receiving the food to be smoked, a mixing chamber for receiving air from the smoking chamber with a fan for drawing the air from the smoking chamber and returning it to the mixing chamber and creating a swirling air action at a higher pressure within the mixing chamber. Liquid smoke is sprayed into the swirling air in the mixing chamber to effect a mixing of the air therein with the liquid smoke and the mixture is returned to the smoking chamber for expansion therein under a lower pressure.

13 Claims, 2 Drawing Sheets

APPARATUS FOR SMOKING FOOD

This is a divisional of application Ser. No. 08/758,975 filed on Dec. 2, 1996, now U.S. Pat. No. 5,762,985 which is a continuation of Ser. No. 08/420,961 filed Apr. 18, 1995, now abandoned, entitled Method and Apparatus for the Treatment of Material to be Smoke-Cured, which was the National Stage of International Application No. PCT/EP93/02840, filed Oct. 14, 1993.

FIELD OF INVENTION

The invention concerns a method for the treatment of material to be smoke-cured, particularly meat and sausages, with a mixture of air and a watersoluble liquid having a smell and the taste of smoke also called liquid smoke, which is sprayed into the air of a smoking chamber.

DESCRIPTION OF THE RELATED ART

Up to now in such a method smoking devices have been used which atomize the liquid smoke by means of pressurised air. The spray mist developed thereby is introduced e.g. 15 cm above the bottom through the back wall of the smoking chamber opposite to the access door. In the upper region of the smoking chamber a fan is arranged in such an embodiment which provides for circulation of the volume formed by air and liquid smoke within the smoking chamber. Because together with the liquid smoke sprayed in also pressurized air is introduced into the smoking chamber, at least one exhaust air flap is necessary to let off the surplus volume.

In addition to the fact that with the known method necessarily a loss of volume of liquid smoke and air must occur, also the results of smoke-curing achieved are not satisfactory. Hence, with the known method and apparatus not only a loss of particularly liquid smoke is to be regarded as disadvantageous because the known smoking chamber can be operated with an open exhaust air flap only, but also uniformity of distribution of the liquid smoke within the smoking chamber is not satisfactory because a part thereof prematurely deposits on wall and bottom of the smoking chamber instead of arriving at the material to be smoked or smoke-cured, respectively.

SUMMARY OF THE INVENTION

Consequently the task underlying the invention is seen in the provision of a method and an apparatus of the kind mentioned above which is more economical and grants a better quality of the smoke-cured material. At the same time particularly the consumption of liquid smoke shall be decreased and a more uniform smoke-cure shall be achieved.

Having regard to the method this task is solved in that pure liquid smoke is sprayed directly into air which is sucked out of the smoking chamber into a separate mixing region, swirled in this mixing region thereby increasing the pressure, and subsequently relaxed or relieved, respectively, again into the smoking chamber.

Because no pressurized air is used for spraying the liquid smoke in, no increase of volume will occur so that the exhaust air flap can be closed during operation. Losses of liquid smoke by an exit from the smoking chamber, as with the prior art, are thereby avoided. Because immediately after spraying into the sucked-in air swirling thereof occurs, a particularly intensive formation of a mixture is provided. Swirling with increases of pressure and subsequent relaxation leads to a distribution of the liquid smoke within the air in the form of partly finest droplets (1 to 25 m) and partly vapour. Accordingly there occurs the formation of a droplet phase as well as of a gas phase so that the same physical conditions are present as with the traditional glow smoke. The finely atomized, dry and stable smoke achieved according to the invention can be deposited on the material to be smoked or smoke cured, respectively, in the smoking chamber under the same conditions as with the traditional glow smoke-cure. It is to be understood that not only, as mentioned, a removal of exhaust air is not necessary but also the admission of fresh air can be omitted.

The amount of liquid smoke to be sprayed in depends on the respective material to be smoke-cured and its degree of smoke cure desired and is sprayed in with a pressure of preferredly 3 bar in intervals and the duration of the spraying can be automatically controlled.

The method according to the invention leads not only to a saving of liquid smoke but also to a particularly good and uniform admission of liquid smoke to the material to be smoke-cured whereby a quality of smoke-cure can be achieved which was not possible with the use of liquid smoke up to now.

Having regard to the apparatus the task underlying the invention is solved using a smoking chamber, a spraying device, a supply conduit for the liquid smoke and a fan and the following features in accordance with the invention, namely in that the spraying device is a spray nozzle for pure liquid smoke, said nozzle being situated immediately at the end of the supply conduit for direct spraying liquid smoke into the fan and being arranged coaxially at the suction side of the latter, at least one blowing nozzle for the swirled mixture of air and liquid smoke being arranged at the pressure side of the fan and opening into the smoking chamber, and in that the mixing region is located between spray nozzle and blowing nozzle.

The so-to-say injection of pure liquid smoke into the fan, swirling of the generated mixture of liquid smoke and smoking chamber air, the inherent pressure increase on the pressure side of the fan, and the subsequent relaxation via the nozzle or nozzles, provide for the fine distribution of liquid smoke in the air by the mentioned two-phase formation, as elucidated above, and hence for conditions which are similar to the conventional glow smoke-cure.

Advantageously the fan is located in a separate mixing chamber which forms a broadened mixing region, with its suction side facing the inlet opening of the mixing chamber to which the spray nozzle is appertaining. The fan with its pressure side delivers into the interior of the mixing chamber and impinges at least one blowing nozzle forming an outlet opening situated in the wall of the mixing chamber. Appropriately the mixing chamber is a hollow hood which is located centrally in the upper region of the smoking chamber and which in its cross-section forms essentially an inverse U with a hollow transversal web and two hollow vertical webs. Said hollow hood in the center of the transversal web of the U comprises the fan being a radial fan. At the ends of the two vertical webs the hollow hood has at least one blowing nozzle each having a downward blowing direction. A clear height of the hollow transversal web of the U which is only slightly larger than the thickness of the radial fan has proved to be practical.

For delivery of the liquid smoke it is proper to arrange a container pump for the liquid smoke at the beginning of a supply conduit towards the spray nozzle, for setting the liquid smoke under pressure. In a preferred embodiment the spray nozzle is an axial full cone nozzle with an opening angle of 120°. At the same time the radial fan comprises an intake port with a free diameter of 215 mm. In the conduit a two-way magneto-flow-valve is arranged, the time interval control thereof provided by a microprocessor being respectively programmable.

Additional advantages and embodiments of the invention are subject to the subclaims. The invention is explained in more detail showing an embodiment of an apparatus for carrying out the method according to the invention by means of the drawings.

DESCRIPTION OF THE PREFERRED EMBODIMENT

Figure 1:
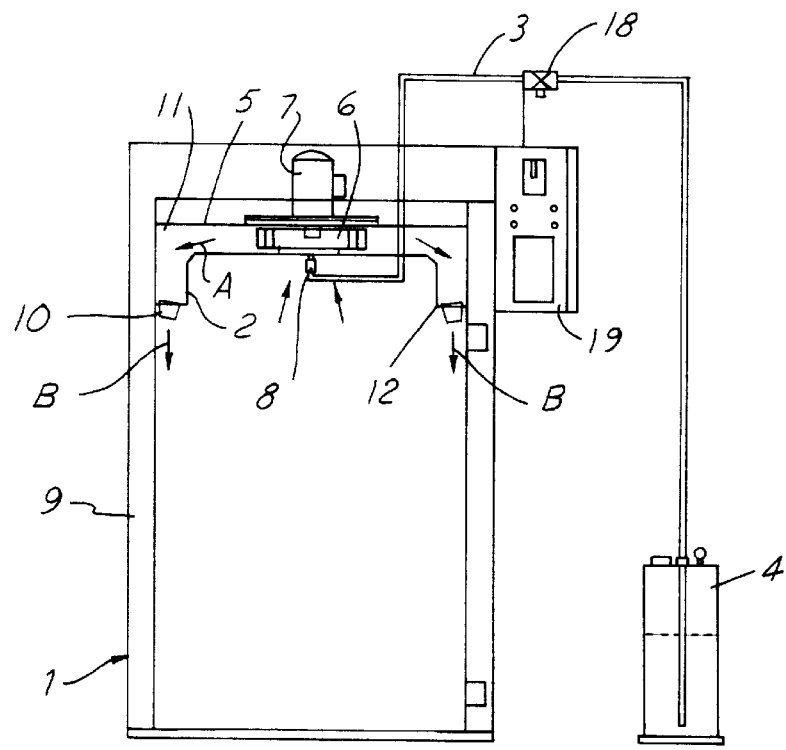
FIG. 1 a schematical front view of an apparatus for carrying out the method according to the invention.
Figure 2:
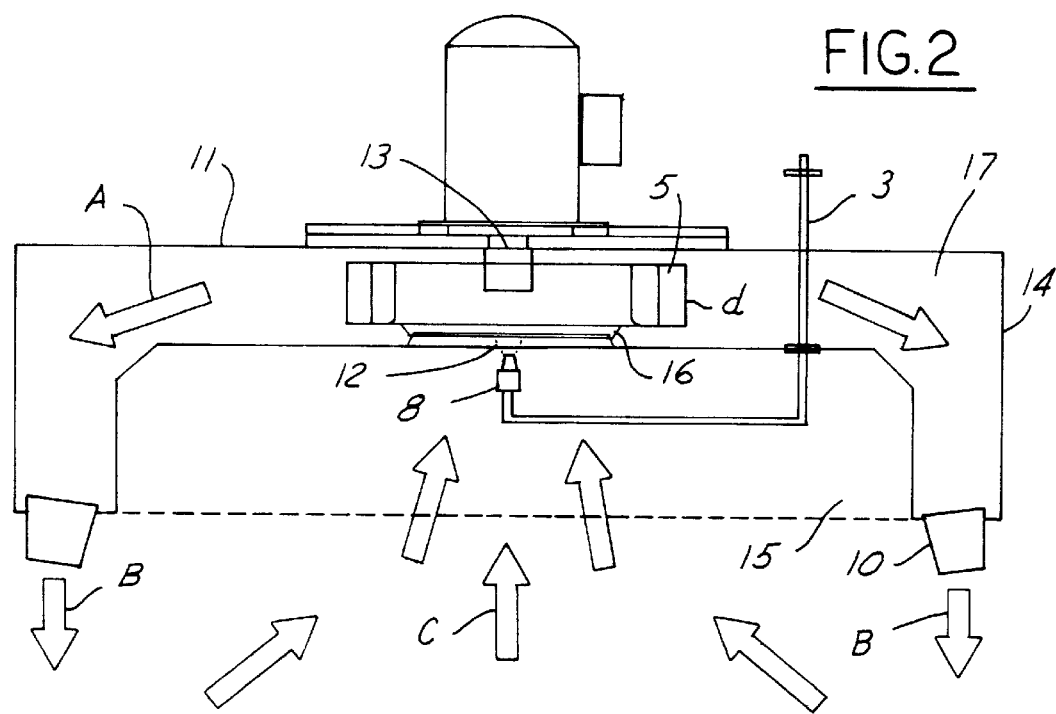
FIG. 2 a cutout with mixing chamber, fan, spray nozzle and conduit, on an enlarged scale.
Figure 3:
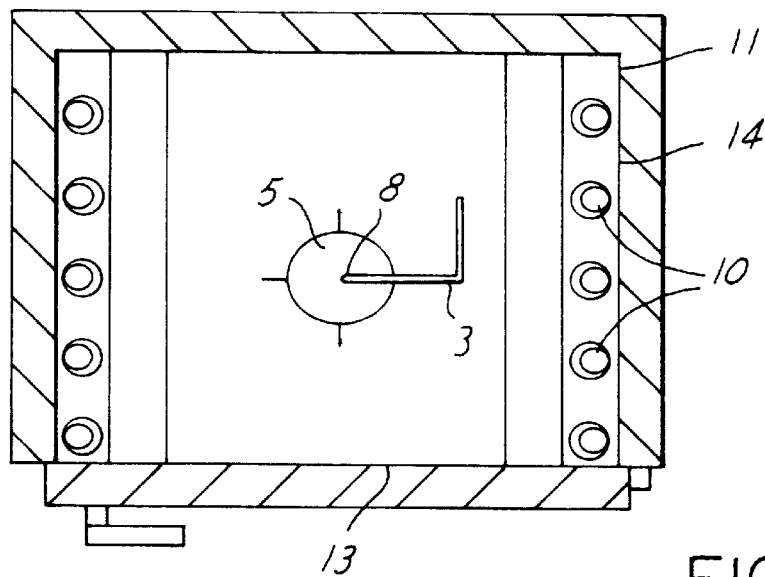
FIG. 3 a view of the mixing chamber from the bottom.
Figure 4:
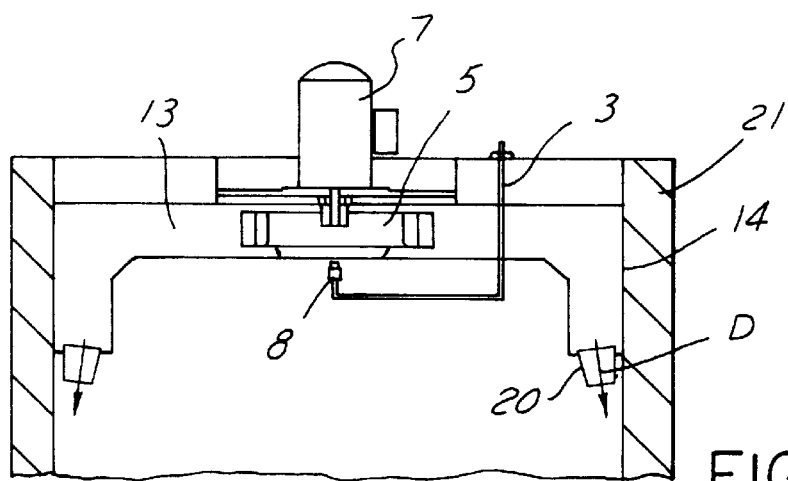
FIG. 4 another embodiment of the mixing chamber in a view corresponding essentially to FIG. 2.
Figure 5:
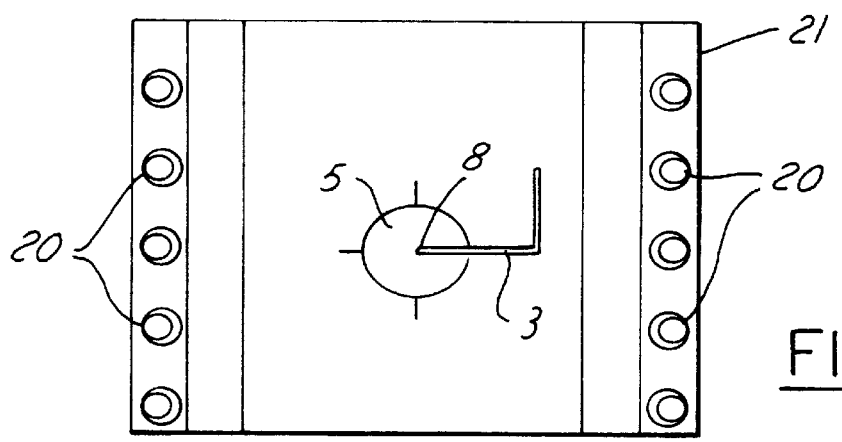
FIG. 5 a bottom view corresponding to FIG. 3 of the embodiment according to FIG. 4.

FIG. 1 shows a smoking chamber 1 with a spraying device 2, a conduit 3 for liquid smoke which is supplied by a container pump 4, and a fan 5 comprising a fan rotor 6, a motor 7 and a shaft (not shown) connecting motor and fan rotor with each other.

The spraying device 2 consists of a spray nozzle 8 for pure liquid smoke which is situated immediately at the end of conduit 3. Said nozzle 8 is arranged coaxially at the suction side of fan 5 for direct spraying into the fan. On the pressure side of fan 5 a blowing nozzle 10 for the swirled mixture of air and liquid smoke is located, said nozzle 10 opening into the interior 9 of smoking chamber 1. The flow from the fan 5 as well as the exit from blowing nozzle 10 are hinted by arrows A and B. Fan 5 with its suction side in a separate mixing chamber 11 faces an inlet opening 12 (FIG. 2) of the mixing chamber to which the spray nozzle 8 is appertaining in a small distance. Fan 5 with its pressure side supplies into the interior of mixing chamber 11. In the case shown several blowing nozzles 10 forming outlet openings in the wall 12 of mixing chamber 11 are impinged by fan 5. As to be seen from FIG. 1, in the illustrated embodiment mixing chamber 11 is a hollow hood which is located centrally in the upper region of interior 9 of smoking chamber 1 and in its cross-section is shaped essentially as an inverse U comprising a hollow transversal web 13 and two hollow vertical webs 14. In the center of transversal web 13 the hollow hood comprises fan 5 developed as a radial fan. At each of the ends of the two hollow vertical webs 14 five blowing nozzles 10 are arranged in a row with blowing direction downwardly (arrows B).

Evidently the hollow transversal web possesses a clearance h which is not considerably larger than the thickness D of radial fan 5.

For enhancing the flowing conditions in the region of the deflection of the air streams after exit from fan 5 and before entry into blowing nozzle 10 inner corners between the two hollow vertical webs 14 and the hollow transversal web 13 can be chamfered each as shown (FIGS. 1 to 3), however, a normal rectangular structure as shown in FIGS. 4 and 5 would be also sufficient. At the lower end of each of the hollow vertical webs 14 five blowing nozzles 10 are arranged in a row. As to be seen from the bottom view according to FIG. 3, the U of the mixing chamber 11 shows essentially the shape of a rectangular or of a box, and between transversal and vertical webs 10, 14 on one side and the side walls 15 (only one thereof is to be seen from FIG. 2) a type of funnel is formed into which air aspirated in the direction of arrow C from the interior 9 of smoking chamber 1 can flow in towards the inlet opening 12. Fan 5 comprises an intake port 16 which is connected to the inlet opening 12 of mixing chamber 11 (FIG. 2). In the embodiment shown the inlet opening 12 is reversely drawn into the interior 17 of mixing chamber 11 and so enters the intake port 16 of fan 5. It is to be understood that the clearance area between these two parts should be as small as possible.

The container pump 4 understandably is located at the beginning of conduit 3 for the liquid smoke leading towards spray nozzle 8 for setting the liquid smoke within conduit 3 under pressure. In conduit 3 a magneto-flow-valve 18 is arranged which usefully is a two-way valve. For the control thereof a microprocessor control 19 is provided. As mentioned initially, opening of the valve occurs in time intervals the numbers and duration of which depending on the material in smoking chamber 1 to be smoke-cured on the one side and on the desired degree of smoke-cure on the other side which will be programmed in each case.

In a built embodiment as a spray nozzle 8 an axial full cone nozzle with an opening angle of 120° has been proved useful, and the intake port 16 of radial fan 5 had a diameter of 215 mm.

In the embodiment describe din FIGS. 1 to 3 the blowing nozzles 10 point vertically downwardly. However, the arrangement in accordance with the second embodiment of the mixing chamber 21 as shown in FIGS. 4 and 5 is preferred, the arrangement within the smoking chamber 1 being the same as described above. For the same parts same reference numerals are also used.

As to be seen from FIGS. 4 and 5, in this case the blowing directions (arrows D) of blowing nozzles 20 are downwardly diverging towards the walls of smoking chamber 1 at both sides. Thereby it has proved to be advantageous if the blowing directions D show an angle of approximately 7° from the vertical to the outer sides. So the mixture leaving nozzles 20 is guided along the walls on the outer side of the material to be smoke-cured to the bottom of smoking chamber 1 where a deflection to the interior and a guidance up in the direction of the suction of fan 5 follows, across the material to be smoke-cured. According to experience the described inclination of blowing nozzles 20 in certain cases yields a more uniform impingement on the material to be smoke-cured (which is not shown throughout).

I claim:

1. Apparatus for smoking food comprising, in combination:

- a closed smoking chamber for receiving food to be smoked;
- a spray nozzle;
- conduit means for supplying liquid smoke to the nozzle;
- a mixing chamber having inlet and outlet openings communicating with the smoking chamber;
- a fan for sucking air into the mixing chamber through said inlet from the smoking chamber and recirculating the air back into the smoking chamber through said outlet creating a swirling air action within the mixing chamber between said inlet and outlet openings; and
- said nozzle being arranged to spray liquid smoke into the swirling air action in the mixing chamber.

2. Apparatus according to claim 1, characterized in that the fan (5) is located within the mixing chamber with the suction side of the fan facing said inlet opening.

3. Apparatus according to claim 1, characterized in that the mixing chamber comprises a hollow hood which is arranged centrally in the upper region of the smoking chamber and is essentially inversely U-shaped in cross-section with a hollow transversal web (13) and two hollow vertical webs (14), with the fan (5) comprising a radial fan located at the center of the transversal web, and at least one of said vertical webs comprising a blowing nozzle (10) having a blowing direction aimed downwardly.

4. Apparatus according to claim 3, characterized in that the hollow transversal web (13) of the U possesses a clearance (h) which is only slightly larger than the thickness (d) of the radial fan (5).

5. Apparatus according to claims 3 or 4, characterized in that the two hollow vertical webs (14) at their inner junctions with the hollow transversal web (13) are chamfered each.

6. Apparatus according to claim 3, characterized in that at the lower end of each of the hollow vertical webs a plurality of blowing nozzles (10) are arranged in a row.

7. Apparatus according to claim 6, characterized in that the blowing directions of the blowing nozzles (20) are downwardly diverging towards the walls of the smoking chamber.

8. Apparatus according to claim 7, characterized in that the blowing directions show an angle of approximately 7° to the adjacent walls of the smoking chamber.

9. Apparatus according to claim 1, characterized in that a pump is arranged for pressurizing liquid smoke within the conduit means.

10. Apparatus according to 1, characterized in that in said conduit means a magneto-flow-valve (18) is arranged.

11. Apparatus according to claim 10, characterized in that for controlling the valve (18) a microprocessor control (19) is provided.

12. Apparatus according to claim 10 or 11, characterized in that the valve (18) is a two-way valve.

13. Apparatus according to claim 1, characterized in that the spray nozzle (18) is an axial full cone nozzle with an opening angle of approximately 120°, and that the intake port (16) of the radial fan (5) has a diameter of 215 mm.

* * * * *